Patented Dec. 27, 1938

2,141,698

UNITED STATES PATENT OFFICE 2,141,698

PROCESS OF MAKING CHEESE

William D. Saunders, Blacksburg, Va.

No Drawing. Application March 8, 1937,
Serial No. 129,766

3 Claims. (Cl. 99—116)

This invention relates to the art of cheese making and has particular reference to the production of an American Cheddar cheese in a manner different from what has heretofore been proposed in the particulars pointed out in the following specification and the appended claims.

In the production of such cheese from raw milk, which is the kind of milk to which this invention applies, difficulty has heretofore been experienced in the use or treatment of milk having a high acidity, and many unsuccessful efforts have been made to produce good cheese from such milk.

It is a matter of common knowledge that attempts to make cheese from milk having greater acidity than .22% are unsuccessful. Thus in the standard work by Van Slyke and Publow, "The Science and Practice of Cheesemaking," page 153, it is stated that:—"An acidity equivalent to .20% of lactic acid in milk, when received at the factory, is regarded as the danger line for chedder cheese making." See "The Science and Practice of Cheesemaking" by Van Slyke and Publow, Orange Judd Co., September 1908, p. 21, p. 153; also "Cheesemaking" by Decker and Sammis, The Cheesemaker Book Co., Madison, Wisconsin, 1924, p. 204.

Therefore the present process has particular value in the treatment of those milks which from any cause have a higher acidity than .22%.

The present invention involves particularly the control of the acid content of the whey after coagulation as by rennet, this control being most effectively exercised during what is known as the cooking period.

Initially, it may be stated that raw milk of various acid content may be used. These variations range from .16% for fresh milk to .3% and higher.

I use raw milk altogether. It must, however, not be coagulated, and free from objectionable flavors. It is capable of use with either pasteurized or unpasteurized milk, altho it is to be noted that its principal value is with unpasteurized milk, because pasteurization of milk often results in coagulation in case of initial high acidity.

To the milk I add 5% of starter in all cases. This is a marked addition to the amount of starter usually employed. The starter is a lactic acid development from lactic acid organisms developed in sterilized milk. The purpose of the starter is for bacteria control and the resulting flavor in the cheese. Ordinarily, with present methods, from .5% to 1.5% of starter is used; rarely as much as 2%. The use of such an increased amount of starter, say 5%, causes a very active condition of lactic acid development or fermentation in the cheese milk which has the effect of preventing the development of objectionable organisms, by what may be called a prohibition or inhibition against the development of such objectionable organisms, resulting in a uniform product with respect to the texture and flavor. The addition of this amount of starter increases the acidity of the batch to a corresponding extent and requires some provision for the control subsequently exercised, as hereinafter described.

I then heat the batch to say 85° F. and add the rennet as usual, say 3.5 ounces to a thousand pounds of milk (when this temperature has been reached). The time of coagulation depends on the amount of acidity in the milk and will run from 10 to 30 minutes, say.

After coagulation I start cutting the curd slightly on the soft side, in the case of high acid milk, as the curd firms very rapidly, so as to finish cutting before it is too firm. The curd is cut small, say from ¼ inch to ⅜ inch, so as to firm more rapidly.

As soon as the curd is cut and the whey begins to separate, I test it to determine the percent of acid in the whey. This will depend on the acidity in the milk, running anywhere from .12% to about .22%. It has been found by experience that the acidity of the whey during the cooking must not exceed .17% for any length of time, if at all. If it exceeds that during the latter part of the cooking operation or before drawing the whey it results in an acid condition in the cheese which is injurious or objectionable. Therefore in the event that the acid condition exceeds .17% in the whey, for example, .22%, water is added to the whey or batch in sufficient quantity to reduce the acidity to below .17%. I prefer to add the water at first until the whey shows an acid content of about .14%. I start heating the curd about five minutes after cutting and heat it in about fifteen minutes to 100° F. After heating to 100° F. the whey is tested at intervals so as to be sure that before the acid content reaches .17%, water at 100° F. is added so that the acid in the whey, at no time, rises above .17% before the whey is drawn. Ordinarily, initially, the acid content is held to a point about .14% or .15% because, the development being very rapid, it is desirable that it should not finally exceed .17%. The amount of water is determined by the amount of acidity, and the action of the water is to dilute the acid.

The theory on which this operation is based is that in the treatment of casein in the presence of an excess acid solution, an action of adsorption occurs which results in the deposit of acid on the casein and the formation of a sour curd and a sour cheese later on.

When the curd has shrunken to a point that when pressed between the hands it shows a tendency to spring back, or a rubbery feel, and the curd falls apart readily when the pressure is released and shows a slightly wrinkled condition, I draw the whey, which, at this time has as an acid content not higher than .17%, removing the whey as rapidly as possible.

In short, I maintain the acidity of the whey by the addition of water as may be necessary while the batch is cooking, to keep the acidity below .17%, which I consider the danger point of acidity of the batch in cheese making. This simply involves testing from time to time for acid content by the usual method, which is well known in the art. The time of cooking is determined by the amount of acidity in the milk and the temperature. It is less for milk of high acidity than for milk of low acidity.

The process therefore involves or includes the step of adding water to the batch to dilute the whey acidity during the period after cutting the curd or between cutting the curd and drawing the whey, which is the cooking period, to keep the whey acidity below .17%.

Thereafter, the treatment of the curd is substantially the same as in ordinary processes of manufacturing American Cheddar cheese, such as Cheddaring, milling, salting, pressing and ripening. I prefer to ripen the cheese at a temperature of about 60° F. which is somewhat higher than the temperatures ordinarily employed, which gives fine results, which follow, in my opinion, from the use of the relatively large percentage of starter, which controls or inhibits the development of objectionable bacteria, and the acidity control maintains conditions favorable for the development of desirable flavors and the ripening process.

As compared with present methods of making such cheese, time is saved in the processing, seldom taking as much as three hours from heating the milk in the beginning to getting the cheese in the press.

The cheese ripens more rapidly than cheese made by present methods; it might be said ⅓ of the time as a rule. When milk is processed by this method uniformity of product results at all times, as well as uniformly good flavor and texture, since the development occurs under controlled conditions which are or can be made practically uniform, as heretofore described.

I claim:

1. In the art of cheese making the steps of increasing the acidity of raw milk to a point exceeding .22% by the addition thereto of substantially 5% of starter, and thereafter adding water to the cheese batch during the cooking period after cutting the curd, in an amount sufficient to maintain the whey acidity below .17%.

2. In the art of cheese making, the steps of increasing the acidity of raw milk to a point exceeding .22% by the addition thereto of substantially 5% of starter, and thereafter adding water to the cheese batch during the cooking period after cutting the curd, in an amount sufficient to maintain the whey acidity between .14% and .17%.

3. In the art of cheese making, the steps of adding about 5% of starter to the milk, to cause a condition of acidity exceeding .22%, coagulating the milk, testing the whey as it begins to separate to determine its acidity, cooking the batch, and adding sufficient water immediately after cutting and during the cooking operation and before drawing any of the whey to maintain the acidity of the whey below .17%, and then finally drawing the whey.

WILLIAM D. SAUNDERS.